United States Patent [19]

Fritschel et al.

[11] Patent Number: 4,624,988

[45] Date of Patent: Nov. 25, 1986

[54] CURING OF THERMOPLASTIC TETRAFLUOROETHYLENE/PERFLUOROALKYL ETHYLENE COPOLYMERS

[75] Inventors: Scott J. Fritschel, Wilmington, Del.; William D. Saunders, Parkersburg, W. Va.

[73] Assignee: E. I. Du Pont de Nemours and Company, Wilmington, Del.

[21] Appl. No.: 789,758

[22] Filed: Oct. 21, 1985

[51] Int. Cl.$^4$ .................. C08F 14/26; C08J 3/24; C08K 5/13

[52] U.S. Cl. .................. 525/151; 525/326.3; 525/366; 525/383

[58] Field of Search ............. 525/326.3, 366, 383, 525/151

[56] References Cited

U.S. PATENT DOCUMENTS 3,086,154  8/1972  Ali Khan .............. 525/326.3
3,243,411  3/1966  Tawney et al. .......... 260/61
4,529,784  7/1985  Finlay ................. 525/326.3

Primary Examiner—Allan M. Lieberman

[57] ABSTRACT

Crosslinking of copolymers of tetrafluoroethylene and perfluoroalkylethylene by heating in the presence of $K_2AF$ is described.

2 Claims, No Drawings

CURING OF THERMOPLASTIC TETRAFLUOROETHYLENE/PERFLUOROALKYL ETHYLENE COPOLYMERS

BACKGROUND

It is desirable to crosslink fluorinated, non-elastomeric thermoplastic polymers to improve their dimensional stability (creep resistance) in molded article form. The crosslinking of elastomeric fluorinated polymers with a variety of crosslinking agents to improve their elastic recovery and tensile modulus is well known (see, for example, U.S. Pat. No. 3,243,411 to Tawney et al). A known crosslinking agent for this purpose is the dipotassium salt of bis-phenol AF (commonly called $K_2AF$) This salt has the formula

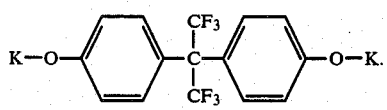

$K_2AF$ is used in the aforementioned Tawney patent.

Heretofore, substantially perfluorinated fluorocarbon polymers that are non-elastomeric have not been crosslinked because they lack chemically reactive cure sites and are relatively inert chemically. It would be desirable to find a means to crosslink such copolymers to improve their dimensional stability (creep resistance) in molded form, even at the sacrifice of tensile strength.

SUMMARY OF THE INVENTION

This invention is directed to a process for crosslinking non-elastomeric, melt-fabricable fluorocarbon copolymers of tetrafluoroethylene and fluoroalkyl ethylene by treating said copolymer with the dipotassium salt of bis-phenol AF in an amount sufficient to cause crosslinking, and heating the copolymer to melt conditions for a time sufficient to crosslink the copolymer.

DETAILED DESCRIPTION

By "nonelastomeric" is meant that the molded copolymer is not a material which at room temperature can be stretched repeatedly to at least twice its original length and, upon immediate release of the stress, will return with force to its approximate original length.

By "melt fabricable" is meant that the copolymer melts at temperatures below 310° C.

Preferably the copolymers are copolymers of 93-99 mol % tetrafluoroethylene, and complementally 7-1 mol % fluoroalkyl ethylene comonomers of the formula $R_fCH=CH_2$ wherein $R_f$ is perfluorinated alkyl of 2-10 carbon atoms. Most preferably the amount of comonomer will be 1-3 mol %.

The crosslinking process can be carried out simply by adding the $K_2AF$ to the copolymer and heating the mixture to melt it. This temperature, called the curing temperature, will be between about 300°-340° C., preferably 310°-330° C. Alternatively, the $K_2AF$ can be added to already molten copolymer. Crosslinking occurs in the polymer melt and is complete in 1-8 minutes at 372° C. or 4-30 minutes at 325° C. For compression molding or free sintering, fast cures are desirable in order to have the fabricated part retain its proper dimensions. For injection molding an induction time is required, followed by a relatively rapid cure.

The amount of $K_2AF$ present will depend on the amount of comonomer present in the copolymer. Ordinarily 3-12 wt % based on weight of copolymer will be used and most preferably 5-8 wt %.

The mixture to be crosslinked can also contain, and in many instances will preferably contain, HF scavengers such as MgO or antioxidants such as CuI.

This crosslinking can also be carried out with the addition of inert reinforcing agents such as glass fiber.

The mixing of the fluorinated polymer with $K_2AF$ and the reagents mentioned above may be carried out as a slurry process in an organic solvent if desired. Suitable solvents are perhaloalkanes such as Freon 113 (1,1,2-trichloro-1,2,2-trifluoroethane). Another method of mixing the fluorinated polymer with the curing agent is ball milling.

The utility of this invention is the improvement of the cured polymer, with respect to uncured polymer, in apparent modulus and resistance to a compressive load (creep resistance). Evidence of this is given in the tables below. Crosslinking also results in reduced elongation of cured polymer at some sacrifice in strength.

EXAMPLES

The following Examples describe the preparation of compression molded samples of blends of copolymer with crosslinking agent additives. Amounts of the additives present along with various compression molding temperatures used are recited in the tables below. Creep test results are recited for various creep loadings and apparent modulus data of the molded samples is also set forth in the Tables.

Creep was determined by ASTM 62-64, except that the sample was 0.3 inches thick. In the creep test, % creep after 6 minutes is measured to record elastic deformation while the sample is under initial stress. Creep between 6 minutes and 24 hours is measured to record viscous deformation. These two values are then added to provide total creep which is indicative of the degree of crosslinking.

Apparent modulus was determined by dividing stress (load) by total creep percent.

Tensile data was determined by the procedures of ASTM D-638 except the crosshead speed was 10 inches per minute.

EXAMPLE 1

Melt-fabricable, nonelastomeric copolymer composed of 99 mole % of tetrafluoroethylene and 1.0 mole % perfluorobutyl ethylene in the form of fluff was mixed in Freon® 113 with selected pph (parts per hundred) $K_2AF$, MgO and CuI for five minutes at room temperature. The solvent was removed under vacuum and the mixture was air dried followed by vacuum drying at 110° C./24 mm Hg for 12 hours.

36 gm of the mixture was compression molded and cured (crosslinked) under the following conditions in a 1" by 3" mold: The sample was cold pressed 10 minutes at 10,000 lbs/sq.in., then heated to 325° C. over 30-45 minutes under atmospheric pressure and maintained at 325° C. at atmospheric pressure for 30 minutes. The pressure was raised to and maintained at 5,000 to 10,000 lbs while cooling the top heater at a rate of 50° C./15 minutes while the bottom heater was turned off. When 250° C. was reached, the cooling rate was increased by running cold water through both heaters while maintaining pressure. At 50° C., the sample was removed Additive amounts, test conditions and results obtained from samples of polymer with varying amounts of the curing agent, are given in Table 1.

TABLE 1

PFBE 2.5 wt % (1.0 mol %)

| Control or Example | K$_2$AF pph | MgO pph | CuI pph | Test Temp. °C. | Load (g) | % Creep 6 min. | % Creep 24 hr. | Total | Apparent Modulus (psi) |
|---|---|---|---|---|---|---|---|---|---|
| Control A | — | — | — | 24 | 2000 | 4.62 | 0.76 | 5.38 | 37,200 |
| 1-1 | 3.0 | 1.0 | 0.5 | 24 | 2000 | 4.98 | 0.71 | 5.69 | 35,100 |
| 1-2 | 6.0 | 2.0 | 1.0 | 24 | 2000 | 4.12 | 0.25 | 4.37 | 46,100 |
| 1-3 | 12.0 | 2.0 | 1.0 | 24 | 2000 | 3.65 | 0.31 | 3.96 | 50,400 |
| Control B | — | — | — | 100 | 750 | 3.47 | 0.19 | 3.67 | 20,400 |
| 1-4 | 3.0 | 1.0 | 0.5 | 100 | 750 | 3.30 | 0.23 | 3.53 | 21,100 |
| 1-5 | 6.0 | 2.0 | 1.0 | 100 | 750 | 1.90 | 0.06 | 1.96 | 38,300 |
| 1-6 | 12.0 | 2.0 | 1.0 | 100 | 750 | 2.64 | 0.29 | 2.93 | 25,500 |
| Control C | — | — | — | 200 | 750 | 7.06 | 1.23 | 8.29 | 9,050 |
| 1-7 | 3.0 | 1.0 | 0.5 | 200 | 750 | 6.91 | 0.98 | 7.89 | 9,500 |
| 1-8 | 6.0 | 2.0 | 1.0 | 200 | 750 | 3.66 | 0.61 | 4.27 | 17,600 |
| 1-9 | 12.0 | 2.0 | 1.0 | 200 | 750 | 6.55 | 0.90 | 7.45 | 12,400 |

It appears that the most effective concentration of K$_2$AF is 6 pph K$_2$AF for a resin with 2.5 wt % PFBE, although 12 pph is better for room temperature total creep and apparent modulus.

EXAMPLE 2

100 g of a melt-fabricable nonelastomeric copolymer containing 98.4 mol % tetrafluoroethylene and 1.6 mol % perfluorobutylethylene in the form of fluff was combined with 4.00 gms K$_2$AF, 2.00 gms MgO and 1.00 gm CuI and ball milled at room temperature. A 36 gm sample of the resulting mixture was then compression molded in a 1" by 3" mold using the conditions given in Example 1. Test results obtained from this sample, and other samples prepared in the same manner using the same melt-fabricable nonelastomeric copolymer but varying amounts of additives are given in Table 2.

TABLE 2

COMPRESSION CREEP/TENSILE TESTS - PFBE 3.9 wt % (1.6 mol %)

| Experiment | K$_2$AF pph | MgO pph | CuI pph | Test Temp °C. | Load psi | % Creep 6 min. | % Creep 24 hr. | Total | Apparent Modulus psi |
|---|---|---|---|---|---|---|---|---|---|
| Control D | 0 | 0 | 0 | 24 | 2000 | 4.80 | 0.82 | 5.62 | 35,600 |
| 2-1 | 4 | 2 | 1 | 24 | 2000 | 5.92 | 0.50 | 5.42 | 36,900 |
| 2-2 | 6 | 2 | 1 | 24 | 2000 | 4.03 | 0.53 | 4.56 | 43,900 |
| 2-3 | 8 | 2 | 1 | 24 | 2000 | 6.77 | 0.92 | 7.69 | 26,000 |

TABLE 2-A

TENSILE DATA

| Sample | Tensile Strength at break | Elongation at break |
|---|---|---|
| Control D | 4070 psi | 400 psi |
| 2-2 | 2500 psi | 20 psi |

EXAMPLE 3

250 g of a melt-fabricable nonelastomeric copolymer containing 98.3 mol % tetrafluoroethylene and 1.7 mol % perfluorobutylethylene in the form of fluff was combined with varying amounts of K$_2$AF, MgO and CuI and ball milled. A 120 gm sample of the resulting mixture was then compression molded in a 6" by 6" mold using the conditions given in Example 1. Tensile bars were cut from the resulting plaque and the test results from this and other samples prepared in the same manner using the same melt-fabricable nonelastomeric copolymer are given in Table 3.

TABLE 3

TENSILE TEST RESULTS - PFBE 4.1 wt % (1.7 mol %)

| | K$_2$AF pph | MgO pph | CuI pph | psi Yield (psi) | Tensile Strength at break (psi) | Elongation at break (psi) | Test Temp °C. |
|---|---|---|---|---|---|---|---|
| Control | 0 | 0 | 0 | 2470 | 3680 | 390 | 24 |
| 3-1 | 2 | 2 | 1 | N/A | 2520 | 47 | 24 |
| 3-2 | 4 | 2 | 1 | N/A | 2630 | 37 | 24 |
| 3-3 | 6 | 2 | 1 | N/A | 2680 | 27 | 24 |
| 3-4 | 8 | 2 | 1 | N/A | 2790 | 15 | 24 |

EXAMPLE 4

50 g of a melt-fabricable nonelastomeric copolymer containing 99 mol % tetrafluoroethylene and 1.0 mol % perfluorobutylethylene in the form of fluff was mixed with Freon® 113 with varying amounts of K$_2$AF, MgO and CuI and glass fiber (OCF-416, ¼" × 10u) for 2 minutes. The solvent was removed under vacuum and the mixture was air-dried followed by drying at 110° C./4 Hg for 12 hours. A 36 gm sample of the resulting mixture was then compression molded in a 1" by 3" mold using the conditions given in Example 1. Creep test results and apparent modulus obtained from these samples are given in Table 4.

TABLE 4

COMPRESSION CREEP - PFBE 2.5 wt % (1.0 mol %)

| Experiment | K$_2$AF pph | MgO pph | CuI pph | glass pph | Test Temp. °C. | psi Load | % Creep 6 min. | % Creep 24 hr. | Total | Apparent Modulus (psi) |
|---|---|---|---|---|---|---|---|---|---|---|
| Control | — | — | — | — | 24 | 2000 | 4.62 | 0.76 | 5.38 | 37,200 |
| 4-1 | 3.0 | 1.0 | 0.5 | — | 24 | 2000 | 4.98 | 0.71 | 5.69 | 35,100 |
| 4-2 | 6.0 | 2.0 | 1.0 | — | 24 | 2000 | 4.12 | 0.25 | 4.37 | 46,100 |
| 4-3 | 12.0 | 2.0 | 1.0 | — | 24 | 2000 | 3.65 | 0.31 | 3.96 | 50,400 |
| Control | — | — | — | 10 | 24 | 2000 | 5.49 | 0.36 | 5.85 | 35,500 |
| 4-4 | 3.0 | 1.0 | 0.5 | 10 | 24 | 2000 | 3.72 | 0.29 | 4.01 | 49,800 |
| 4-5 | 6.0 | 2.0 | 1.0 | 10 | 24 | 2000 | 4.21 | 0.18 | 4.39 | 47,400 |
| 4-6 | 12.0 | 2.0 | 1.0 | 10 | 24 | 2000 | 4.11 | 0.22 | 4.33 | 46,100 |
|  | 3.0 | 1.0 | 0.5 | 20 | 24 | 2000 | 3.65 | 0.29 | 3.94 | 50,600 |
| 4-7 | 6.0 | 2.0 | 0.5 | 20 | 24 | 2000 | 3.45 | 0.20 | 3.65 | 55,200 |
| 4-8 | 12.0 | 2.0 | 1.0 | 20 | 24 | 2000 | 3.48 | 0.27 | 3.75 | 53,700 |
| Control | — | — | — | — | 260 | 750 | 18.5 | 1.84 | 20.34 | 3,750 |
| 4-9 | 3.0 | 1.0 | 0.5 | — | 260 | 750 | 20.1 | 7.42 | 27.52 | 2,700 |
| 4-10 | 6.0 | 2.0 | 1.0 | — | 260 | 750 | 13.8 | 10.2 | 24.0 | 3,100 |
| 4-11 | 12.0 | 2.0 | 1.0 | — | 260 | 750 | 14.0 | 4.77 | 18.77 | 4,050 |
| Control | — | — | — | 10 | 260 | 750 | 5.84 | 1.23 | 7.07 | 11,000 |
| 4-12 | 3.0 | 1.0 | 0.5 | 10 | 260 | 750 | 6.65 | 2.13 | 8.78 | 8,550 |
| 4-13 | 6.0 | 2.0 | 1.0 | 10 | 260 | 750 | 6.75 | 1.88 | 8.63 | 8,750 |
| 4-14 | 12.0 | 2.0 | 1.0 | 10 | 260 | 750 | 5.99 | 2.67 | 8.66 | 8,750 |
| Control | 3.0 | 1.0 | 0.5 | 20 | 260 | 750 | 5.42 | 1.63 | 7.05 | 10,600 |
| 4-15 | 6.0 | 2.0 | 1.0 | 20 | 260 | 750 | 4.35 | 1.50 | 5.85 | 12,800 |
| 4-16 | 12.0 | 2.0 | 1.0 | 20 | 260 | 750 | 3.73 | 1.71 | 5.44 | 13,800 |

We claim:

1. A process for crosslinking non-elastomeric, melt-fabricable fluorocarbon copolymers of tetrafluoroethylene and perfluoroalkyl ethylene which comprises treating the copolymer with the dipotassium salt of bisphenol AF in an amount effective to cause crosslinking and heating the copolymer at 300°–340° C. for 4–30 minutes.

2. The process of claim 1 wherein the copolymer comprises tetrafluoroethylene and perfluorobutyl ethylene.

* * * * *